US008663379B2

United States Patent
Lechner et al.

(10) Patent No.: US 8,663,379 B2
(45) Date of Patent: Mar. 4, 2014

(54) COATING FOR MACHINE PARTS USED IN THE PRODUCTION OF PIG IRON OR STEEL

(75) Inventors: Stefan Lechner, Leonding (AT); Marinko Lekic-Ninic, Etmissl (AT)

(73) Assignee: Siemens VAI Metals Technologies GmbH (AT)

( * ) Notice: Subject to any disclaimer, the term of this patent is extended or adjusted under 35 U.S.C. 154(b) by 0 days.

(21) Appl. No.: 13/699,430

(22) PCT Filed: May 10, 2011

(86) PCT No.: PCT/EP2011/057483
§ 371 (c)(1),
(2), (4) Date: Jan. 24, 2013

(87) PCT Pub. No.: WO2011/144493
PCT Pub. Date: Nov. 24, 2011

(65) Prior Publication Data
US 2013/0112112 A1    May 9, 2013

(30) Foreign Application Priority Data

May 21, 2010  (AT) .................................. A 838/2010

(51) Int. Cl.
- *C09D 1/00* (2006.01)
- *C09D 1/02* (2006.01)
- *C04B 35/63* (2006.01)
- *C04B 35/626* (2006.01)
- *C09C 1/40* (2006.01)
- *C09C 3/06* (2006.01)
- *C23C 24/08* (2006.01)
- *C23C 26/00* (2006.01)
- *C23C 30/00* (2006.01)
- *C21B 7/06* (2006.01)

(52) U.S. Cl.
USPC .................. 106/286.1; 106/286.4; 106/286.5; 106/286.8; 106/287.1; 106/287.17; 427/397.8

(58) Field of Classification Search
USPC .......... 106/286.1, 286.4, 286.5, 286.8, 287.1, 106/287.17, 600, 635; 427/397.8
See application file for complete search history.

(56) References Cited

U.S. PATENT DOCUMENTS

| | | | | |
|---|---|---|---|---|
| 3,502,447 A | | 3/1970 | Daniels | ........................... 75/233 |
| 3,572,992 A | * | 3/1971 | Komeya et al. | ................. 23/412 |
| 3,991,148 A | * | 11/1976 | Lumby et al. | ................. 264/671 |
| 6,004,624 A | * | 12/1999 | Bates et al. | ................. 427/376.1 |
| 2006/0264314 A1 | * | 11/2006 | Esmaeilzadeh | ............... 501/98.2 |
| 2013/0112112 A1 | | 5/2013 | Lechner et al. | ............... 106/600 |

FOREIGN PATENT DOCUMENTS

| | | | | | |
|---|---|---|---|---|---|
| DE | 1956676 A1 | | 12/1970 | ............. | C01B 21/06 |
| EP | 0518077 A1 | | 12/1992 | ............. | B32B 18/00 |
| EP | 0590378 A1 | | 4/1994 | ............. | C01B 21/072 |
| JP | 04342468 A | * | 11/1992 | | |
| JP | 05009513 A | * | 1/1993 | | |
| JP | 2004-083334 A | * | 3/2004 | | |
| JP | 2006052442 A | | 2/2006 | ............. | B22F 9/10 |
| WO | 2006/097410 A1 | | 9/2006 | ............. | C04B 35/597 |
| WO | 2011/144493 A2 | | 11/2011 | ............. | B22D 41/02 |

OTHER PUBLICATIONS

Derwent-Acc-No. 2010-K03653, abstract of Korean Patent Specification No. KR972753 B1 (Jul. 2010).*
International Preliminary Report on Patentability, Application No. PCT/EP2011/057483, 2 pages, Nov. 21, 2012.

* cited by examiner

*Primary Examiner* — Anthony J Green
(74) *Attorney, Agent, or Firm* — Ostrolenk Faber LLP

(57) ABSTRACT

A composition used for coating machine parts used in the production of pig iron or steel may include aluminum nitride (AlN) in a proportion of from 10% by weight to 40% by weight, one or more metal-oxidic substances in a proportion of from ≥2 to 10% by weight, of which at least one comes from the group consisting of aluminum oxide, zirconium oxide, and LD converter dust, and an inorganic binder in a proportion of up to 70% by weight, where the % by weight are based on the total weight of the composition. A suspension based on the composition, and the use of the composition or the composition suspension for coating machine parts used in the production of pig iron or steel, are also disclosed.

4 Claims, No Drawings

COATING FOR MACHINE PARTS USED IN THE PRODUCTION OF PIG IRON OR STEEL

CROSS-REFERENCE TO RELATED APPLICATIONS

This application is a U.S. National Stage Application of International Application No. PCT/EP2011/057483 filed May 10, 2011, which designates the United States of America, and claims priority to AT Patent Application No. A838/2010 filed May 21, 2010. The contents of which are hereby incorporated by reference in their entirety.

TECHNICAL FIELD

The present disclosure relates to a composition which is used for coating machine parts used in the production of pig iron or steel. The disclosure further relates to a suspension based on the composition.

BACKGROUND

Machine parts used in the production of pig iron or steel, which in normal operation of a pig iron- or steel-producing plant come into contact with molten media such as pig iron, steel, slag, are covered by solidified deposits of these media. Such deposits alter the weight and dimensions of the machine parts. This results, inter alia, in the disadvantages that accurate shapes cannot be reliably ensured, machine parts can no longer be introduced or removed through openings dimensioned for the machine part without deposits or the drives which move the machine parts cannot cope with the additional weight of the deposits. To keep such disadvantages under control, it is usual to remove the deposits at regular intervals or replace machine parts coated with deposits. This requires a high outlay in terms of time and resources.

SUMMARY

In one embodiment, a composition comprises: aluminum nitride (AlN) in a proportion of from 10% by weight to 40% by weight; one or more metal-oxidic substances in a proportion of from ≥2 to 10% by weight, of which at least one comes from the group consisting of aluminum oxide, zirconium oxide, and LD converter dust; inorganic binder in a proportion of up to 70% by weight, where the % by weight are based on the total weight of the composition.

In a further embodiment, the composition is present as suspension.

In another embodiment, a composition as disclosed above is used for coating machine parts used in the production of pig iron or steel.

In another embodiment, a composition suspension comprises a composition disclosed above and a diluent, where the solids content of the composition suspension is from 40 to 50% by weight, and where the % by weight are based on the total weight of the composition suspension. In a further embodiment, such a composition suspension is used for coating machine parts used in the production of pig iron or steel.

In another embodiment, a process is provided for producing a composition suspension as disclosed above, which process comprises the steps of combining a composition as disclosed above with a first amount of diluent and then stirring the mixture obtained by combining, e.g., using a mixing stirrer, e.g., for a time of at least 50 minutes.

In a further embodiment, a further amount of diluent is added after stirring to the mixture obtained by combining, e.g., after cooling of the stirred mixture to a temperature below 80° C., for example to room temperature.

In another embodiment, a process is provided for coating machine parts used in the production of pig iron or steel with a composition or composition suspension as disclosed above, where the method of application is painting, spraying, or dipping.

In another embodiment, a coating on machine parts used in the production of pig iron or steel is obtained by a process as disclosed above.

DETAILED DESCRIPTION

Embodiments disclosed herein may reduce or avoid deposits on machine parts used in the production of pig iron or steel, which in normal operation of a pig iron- or steel-producing plant come into contact with molten media such as pig iron, steel, slag.

This problem is solved by a composition comprising
  aluminum nitride (AlN) in a proportion of from 10% by weight to 40% by weight
  one or more metal-oxidic substances in a proportion of
    from ≥2 to 10% by weight, of which at least one comes
    from the group consisting of
    aluminum oxide,
    zirconium oxide,
    LD converter dust,
  inorganic binder in a proportion of up to 70% by weight, where the % by weight are based on the total weight of the composition.

The aluminum nitride has, for example, a purity of 99%, an average particle size of 1-1.3 microns, a density of 3.2-3.3 $g/cm^3$, a coefficient of thermal expansion of 4.8 at (50-400° C.) [×10-6/K], a thermal conductivity of 140-200 (W/mK), an E modulus of 3.1-3.6 GPa.

The aluminum nitride is present in a proportion of up to 40% by weight in the composition.

A larger proportion would result in the desired properties of the coating, for example high thermal conductivity, high density, high heat resistance and high compressive and tensile strength of a coating produced by means of the composition, decreasing to below an acceptable level, inter alia because the coating would be porous, and because the binder would not be homogeneously distributed in the coating and would not sufficiently enclose the other constituents of the composition. In addition, a larger proportion of aluminum nitride would mean that the proportion of the binder would decrease to a level at which, in order to achieve good processability in the application of a coating, diluents would have to be added in an amount which would make application of the coating difficult.

The aluminum nitride is present in a proportion of at least 10% by weight in the composition.

For the purposes of the present disclosure, metal-oxidic substances are substances such as iron oxides, aluminum oxide and zirconium oxide ZrO.

The metal-oxidic substances are present in an amount of up to 10% by weight. A larger amount would, in a coating produced on the basis of the disclosed composition, result in the disadvantages of greater porosity of the coating and thus poorer thermal conductivity of the coating and also a low strength of the coating owing to different coefficients of thermal expansion of the particles in the coating.

The metal-oxidic substances are present in an amount of at least 2% by weight in the composition. Below this amount, the properties of a coating obtained on the basis of the disclosed composition which are brought about or aided by the metal-oxidic substances are not ensured.

The metal-oxidic substances have an average particle size of 1-1.3 microns.

The metal-oxidic constituents such as iron oxides, aluminum oxide and zirconium oxide increase the temperature range in which a coating obtained using the composition can be used without damage. In addition, they increase the strength of a coating obtained on the basis of the disclosed composition.

For the purposes of the present disclosure, this is an increase compared to a composition which does not comprise any metallic oxidic constituents.

For the purposes of the present disclosure, LD converter dust is the coarse and fine dust formed in an LD process. These dusts are extracted by the extraction hood and transported to the filter plant. LD converter dust contains metal-oxidic substances. Chemical reactions between a coating obtained from the disclosed composition containing LD converter dust and splashes of slag are reduced because of similar chemical compositions of slag and coating.

An example composition of the LD converter dust used is, for example, Fe 21.3% by weight, $SiO_2$ 12.9% by weight, Mn 4.8% by weight, CaO 41.45% by weight, MgO 6.7% by weight, $P_2O_5$ 1.3% by weight, S 0.05% by weight, $Al_2O_3$ 2.11% by weight, $Cr_2O_3$ 0.30% by weight, $TiO_2$ 0.36% by weight, where these values can fluctuate, for example, by up to +/−2% by weight.

Binders are materials by means of which finely divided solids, for example powders, are adhesively bonded to one another or to a substrate. Solids and binders are intensively mixed so that they become uniformly distributed and all particles of the solid are wetted uniformly by the binder.

The finely divided solids according to this disclosure are the aluminum nitride and the metal-oxidic substances. According to the invention, inorganic binders are used. In the case of inorganic binders, curing occurs as a result of carbonatization or silicification in the presence of oxygen.

Inorganic binders used are, for example, silicates such as potassium silicate or sodium silicate or lithium silicate.

It is also possible to use mixtures of a plurality of different silicates. The inorganic binder can be, for example, a water glass. An example of water glass based on potassium silicate is the product Betol K 28 T from Woellner. An example of water glass based on lithium silicate is the product Betol Li 24 from Woellner. Examples of mixed silicates are the products Betol KN 33, Betol KN 39, Betol KL 33, Betol KLN-T1 from Woellner.

Machine part surfaces coated by means of the disclosed composition repel splashes of slag and steel and the parts remain largely clean.

The disclosed composition can be present as solid or as suspension. It may be present as suspension. This is, for example, the case when the inorganic binder is added as liquid.

The disclosure further provides a composition suspension comprising
  a composition as disclosed above and
  a diluent,
where the solids content of the composition suspension is from 40 to 50% by weight,
where the % by weight are based on the total weight of the composition suspension.

The diluent is, for example, water. It can also be a liquid inorganic binder.

For the purposes of the present disclosure, the term composition suspension refers to a suspension of the disclosed composition. The solids content of the composition suspension is 40-50% by weight at room temperature. Here, the solids content is the content of aluminum nitride AlN and metal-oxidic substances.

With increasing solids content of the suspension, its processability in respect of application by painting or spraying decreases since the suspension becomes increasingly viscous and dries increasingly more quickly. At a solids content above 50% by weight, the suspension is virtually impossible to apply with a justifiable outlay.

In specific embodiments, the compositions or composition suspensions disclosed herein consist of and do not merely comprise the specified components.

The present disclosure further provides for the use of a composition or a composition suspension as disclosed herein for coating machine parts used in the production of pig iron or steel.

The machine parts used in the production of pig iron or steel, which in normal operation of a pig iron- or steel-producing plant come into contact with molten media, are, for example, plant parts in the tapping region of a blast furnace, channels for transfer of pig iron, extraction hoods on the converter, setting ring on the converter, crucible protective metal sheets in the vicinity of a converter, tapping tube, tap in the tilted state, slag ladle, oblique shaft, fume hoods on converters, fume hoods on ladle furnaces, fume hoods on EAF, ladle vehicles, ladle furnace lid of a ladle furnace, steel casting ladle, oxygen blowing lances, sublances.

Molten media here are, for example, pig iron, steel, slag.

The present disclosure further provides a process for producing a composition suspension as disclosed herein, which comprises the steps:
  combining a composition as disclosed herein with a first amount of diluent, and
  then stirring the mixture obtained by combining, e.g., using a mixing stirrer, e.g., for a time of at least 50 minutes.

In an embodiment of the process, it consists of the specified steps.

The use of a high-speed mixing stirrer for stirring may be preferred since uniform distribution of the solids in the composition suspension is achieved more quickly by high-speed stirring than in the case of low-speed stirring. This reduces the time required for producing the composition suspension and as a result less oxidation and less vaporization of constituents of the composition suspension occurs during production of the composition suspension.

A stirring time of at least 50 minutes may be preferred since a shorter time can lead to the composition suspension not being homogeneous enough to be used for coating; this applies particularly in the production of large batches of composition suspension.

During stirring, it may be preferred that the temperature of the mixture does not exceed 90° C., or may further be preferred that the temperature does not exceed 80° C. Temperatures above 90° C. are undesirable because of the formation of water vapor. A desired temperature range of the mixture during stirring may be 20-60° C.

In one embodiment, a further amount of diluent is added after stirring to the mixture obtained by combining, e.g., after cooling of the stirred mixture to a temperature below 80° C., for example to room temperature.

The final viscosity of the composition suspension can in this way be set more easily to a desired value than when the total amount of diluent present in the composition suspension is added all at once. Cooling of the mixture reduces reactions of the mixture with the diluent caused by heat.

In one embodiment, the process consists of and does not merely comprise these steps.

The present disclosure further provides a process for coating machine parts used in the production of pig iron or steel, which in normal operation of a pig iron- or steel-producing plant come into contact with molten media, with a composition or a composition suspension as disclosed herein, where the method of application is, for example, painting, spraying, dipping.

The present disclosure further provides a coating on machine parts used in the production of pig iron or steel, which in normal operation of a pig iron- or steel-producing plant come into contact with molten media, which can be obtained by a process according to embodiments disclosed herein.

EXAMPLES

Examples of a process for producing a composition suspension according to the example embodiments are given below.

Example 1

100 g of aluminum nitride powder having a specific surface area, measured by the BET method, of <2 m$^2$/g and a purity of greater than 99.0% are stirred with 300 g of aluminum oxide powder having a purity of greater than 99.0% and 1400 g of binder which is water glass based on potassium silicate. The mixture obtained is introduced into a coolable stirred vessel and dispersed by means of a mixer for a time of 60 minutes. The suspension obtained is cooled to room temperature and then diluted to a solids content of 30% by weight by addition of water glass based on potassium silicate.

Example 2

100 g of aluminum nitride powder having a specific surface area, measured by the BET method, of <2 m$^2$/g and a purity of greater than 99.0% are stirred with 200 g of aluminum oxide powder having a purity of greater than 99.0%, 100 g of LD converter dust having a composition of: Fe 21.3% by weight, SiO$_2$ 12.9% by weight, Mn 4.8% by weight, CaO 41.45% by weight, MgO 6.7% by weight, P$_2$O$_5$ 1.3% by weight, S 0.05% by weight, Al$_2$O$_3$ 2.11% by weight, Cr$_2$O$_3$ 0.30% by weight, TiO$_2$ 0.36% by weight, and 1400 g of binder which is water glass based on potassium silicate. The mixture obtained is introduced into a coolable stirred vessel and dispersed by means of a mixer for a time of 60 minutes. The suspension obtained is cooled to room temperature and then diluted to a solids content of 30% by weight by addition of water glass based on potassium silicate.

The BET method is an analytical method for determining surface areas by means of gas adsorption and is carried out in accordance with the standard DIN ISO 9277:2003-05.

Machine part surfaces which have been coated as disclosed herein may repel splashes of slag and steel and the parts remain largely clean.

What is claimed is:

1. A product comprising:
   a composition comprising:
   aluminum nitride (AlN) in a proportion of from 10% by weight to 40% by weight,
   one or more metal-oxidic substances in a proportion of from ≥2 to 10% by weight, of which at least one comes from the group consisting of aluminum oxide, zirconium oxide, and LD converter dust, and
   an inorganic binder in a proportion of up to 70% by weight, where the inorganic binder is either (a) a member of the group consisting of potassium silicate, sodium silicate, and lithium silicate, or (b) a mixture of two or more members of this group,
   wherein the % by weight values of the AlN and the metal-oxide substances are based on a total weight of the composition.

2. The product of claim 1, wherein the composition is embodied as a suspension.

3. The product of claim 1, wherein the composition is combined with a diluent to form a composition suspension, where
   wherein the solids content of the composition suspension is from 40 to 50% by weight, and
   wherein the % by weight values are based on a total weight of the composition suspension.

4. A process for coating machine parts used in the production of pig iron or steel, comprising: forming a composition comprising:
   aluminum nitride (AlN) in a proportion of from 10% by weight to 40% by weight,
   one or more metal-oxidic substances in a proportion of from ≥2 to 10% by weight, of which at least one comes from the group consisting of aluminum oxide, zirconium oxide, and LD converter dust, and
   an inorganic binder in a proportion of up to 70% by weight, where the inorganic binder is either (a) a member of the group consisting of potassium silicate, sodium silicate, and lithium silicate, or (b) a mixture of two or more members of this group,
   wherein the % by weight values of the AlN and the metal-oxide substances are based on a total weight of the composition, and
   coating a machine part with the composition.

* * * * *